United States Patent [19]
Murray

[11] 3,844,809
[45] Oct. 29, 1974

[54] WET-PELLETING OF CARBON BLACK

[75] Inventor: Lawrence K. Murray, Toledo, Ohio

[73] Assignee: Phillips Petroleum Company, Bartlesville, Okla.

[22] Filed: Apr. 2, 1973

[21] Appl. No.: 346,831

[52] U.S. Cl. ............... 106/307, 423/445, 423/460
[58] Field of Search ............ 106/307; 423/445, 460

[56] References Cited
UNITED STATES PATENTS

| | | | |
|---|---|---|---|
| 2,427,238 | 9/1947 | Swart | 106/307 |
| 2,639,225 | 5/1953 | Venuto | 106/307 |
| 2,908,586 | 10/1959 | Breandle et al. | 106/307 |
| 3,186,928 | 6/1965 | Keaton et al. | 106/307 |
| 3,243,409 | 3/1966 | Kornicker et al. | 260/45.9 P |
| 3,290,165 | 12/1966 | Iannicelli | 106/307 |
| 3,459,844 | 8/1969 | Cole | 201/2 |
| 3,542,639 | 11/1970 | Manino | 161/186 |
| 3,565,658 | 2/1971 | Frazier et al. | 106/307 |
| 3,645,765 | 2/1972 | Frazier et al. | 106/307 |

OTHER PUBLICATIONS

Chemical Abstracts, 64, 16149 g.

Kirk–Othmer, Encyclopedia of Chem. Tech., Vol. 19, 554, 2nd Ed., 1969.

*Primary Examiner*—Curtis R. Davis

[57] ABSTRACT

Carbon blank is peleted employing a pelleting agent comprising as a pelleting agent a polyethylene glycol substituted with dimethyl silicon groups, as defined.

10 Claims, No Drawings

WET-PELLETING OF CARBON BLACK

This invention relates to the wet-pelleting of carbon black.

In one of its more specific aspects, this invention relates to the employment of a novel pelleting agent.

The wet pelleting of carbon black is well known. Such patents as U.S. Pat. Nos. 3,459,844 and 3,565,658, the disclosures of which are incorporated herein by reference, discuss the general procedures and apparatus employable in the method of this invention.

In the pelleting of carbon black, it is conventional to introduce the black to be pelleted into a pelleter, the black being introduced in its flocculent state. The black is introduced into contact with a pelleting agent, a wide variety of which are known.

Among those pelleting agents employed are water, aqueous molasses solution, water and oil, polyethoxylated amines and the like. The method of the present invention provides a novel type pelleting agent and the novel composition resulting therefrom.

According to the method of the present invention, there is provided a method of pelleting carbon black which comprises introducing a flocculent black into contact with a non-ionic surfactant consisting principally of randomly repeating $+CH_2CH_2O+$ and $+Si(CH_3)_2+$ units in the unit ratio of 7 to 1, respectively, wherein, the molecule 4 to 5 $+Si(CH_3)_2+$ units are present; wherein the molecule is terminated with hydroxyl groups; and wherein the molecule has no silicon to silicon bonds, and has no silicon to hydrogen bonds. The non-ionic surfactant can be represented by the formula $HO-[CH_2CH_2O]_{7n} - [Si(CH_3)_2]_n-H$ wherein n has a value within the range of 4 to 5.

Also, according to this invention, there is provided a novel composition comprising carbon black and the defined non-ionic surfactant. The non-ionic surfactant is commercially available as Dow Corning 470A fluid and is available from Dow Corning Corporation, Midland, Michigan. This material will generally have a viscosity of 275 cs. at 25° C., a flash point of 500° F., a specific gravity of 1.075 at 25° C. and a refractive index of 1.45.

This non-ionic surfactant can be employed for the pelleting of any flocculent black in any prior art apparatus under the prior art conditions of pelleting black. The use of the non-ionic surfactant increases the pack point of the pellets produced, decreases the amount of water required in the pelleting operation and decreases the amount of caking which occurs in the pelleter. Under these conditions, the amount of power required for rotating the pelleter shaft is considerably reduced as is the load on the subsequent pellet dryer.

The method of the present invention can be carried out at prior art temperatures and speed of rotation of the pelleter, the temperature of the black being within the range of from about 70° F to about 500° F. Pelleter speeds will generally be within the range of from about 220 to about 550 RPM.

The non-ionic surfactant will be introduced preferably in the form of an aqueous solution at a temperature within the range of from about 60° F to about 210° F. The non-ionic surfactant will be contained in the aqueous solution in an amount within the range of from about 0.001 to about 0.1 weight percent. The aqueous solution of the ionic surfactant will be employed in an amount within the range of from about 0.4 to about 2.5 parts by weight of carbon black per part of aqueous solution.

The aqueous solution of non-ionic surfactant can have included in it other conventionally-employed additives, for example, up to about 15 weight percent nitric acid and/or up to about 2 weight percent molasses.

After pelleting the black, the pellets can be dried in the conventional manner.

In the practice of this invention, the flocculent black and aqueous solution of non-ionic surfactant are introduced into the pelleter and pelleted in the usual manner. The following runs which illustrate the invention were carried out in this manner, Run I employing the non-ionic surfactant and Run II being substantially identical therewith except that no non-ionic surfactant was employed. Results were as follows:

| Run | I | II |
|---|---|---|
| Carbon Black, No./Hr. | 3430 | 3430 |
| Pelleting Solution, No./Hr | 3720 | 4050 |
| Non-Ionic Surfactant, wt.% | 0.0217 | 0 |
| Molasses, Wt. % | 1 | 1 |
| Temperature of Flocculent Black, ° F | 450 | 450 |
| Temperature of Pelleting Solution | 140 | 140 |
| Pelleter Speed, RPM | 350 | 350 |
| Pellet Pack Point, Pounds | 80 | 63 |
| Pellet Retention on 10 mesh screen, wt. % | 6.5 | 10.9 |

From the above it will be seen that the quantity of aqueous solution required for pelleting was considerably less when employing the method of this invention. Also, the use of the non-ionic surfactant increased the mass strength, that is, the pack point of the pellets and decreased the size of large pellets as reflected by the percentage retention on the 10 mesh screen. Also, as can be seen from the data, less water needs to be removed from the wet pellets in the dryer, resulting in considerable decrease in operating costs of the dryer to produce dried carbon black pellets having the same, e.g., 0.1 wt. percent, water content.

The non-ionic surfactant of the present invention can be introduced in the aqueous solution which is introduced into the pelleter or it can be introduced admixed with the black. Relatedly, regardless of how introduced into the pelleter, the non-ionic surfactant can be introduced continuously or intermittently.

There is some indication that, in addition to the above advantages, the method of this invention acts to improve dispersion of the pelleted blacks in the rubber into which they are blended based upon modulus and tensile strength of the resulting rubber.

It will be evident from the foregoing that various modifications can be made to the method of this invention. Such, however, are considered to be within the skill of the art.

What is claimed is:

1. A method of producing carbon black pellets which comprises:
  a. introducing flocculent black and a non-ionic surfactant into contact to form a mixture, said non-ionic surfactant consisting principally of randomly repeating $+CH_2CH_2O+$ and $+Si(CH_3)_2+$ units in the unit ratio of 7 to 1, respectively, wherein, in the molecule 4 to 5 $+Si(CH_3)_2+$ units are present and wherein the molecule is terminated with hydroxyl groups and wherein said molecule has no silicon to silicon bonds and has no silicon to hydrogen bonds; and, b. pelleting the mixture to form carbon black pellets.

2. The method of claim 1 in which said surfactant is present in an aqueous solution in an amount within the range of from about 0.001 to about 0.1 weight percent of said solution.

3. The method of claim 2 in which said aqueous solution is employed in an amount within the range of from about 0.4 to about 2.5 parts by weight of carbon black per part of aqueous solution.

4. The method of claim 3 in which said aqueous solution contains up to about 15 weight percent nitric acid or up to about 2 weight percent molasses.

5. The method of claim 2 in which said surfactant is present in said aqueous solution in an amount of about 0.02 weight percent and said solution contains about 1 percent molasses by weight.

6. The method of claim 5 in which said solution is employed in an amount within the range of from about 0.4 to about 2.5 parts by weight of carbon black per part of aqueous solution.

7. The method of claim 6 in which said solution is employed in an amount of about 0.9 by weight of carbon black per part of aqueous solution.

8. A composition comprising carbon black and the non-ionic surfactant consisting principally of randomly repeating $+CH_2CH_2O+$ and $+Si(CH_3)_2+$ units in the unit ratio of 7 to 1, respectively, wherein, in the molecule 4 to 5 $+Si(CH_3)_2-$ units are present and wherein the molecule is terminated with hydroxyl groups and wherein said molecule has no silicon to silicon bonds and has no silicon to hydrogen bonds.

9. The composition of claim 8 comprising molasses.

10. The composition of claim 8 comprising nitric acid.

* * * * *